United States Patent [19]

Carter et al.

[11] Patent Number: 4,625,559

[45] Date of Patent: Dec. 2, 1986

[54] PRESSURE TRANSDUCER

[76] Inventors: Roy E. Carter, 83 Cherry Garden Lane, Newport, Essex, CBII 3QB; Francis S. Baker, 23 Rochford Road, Bishops Stortford, Hertfordshire CM23 5ET, both of England

[21] Appl. No.: 691,070

[22] Filed: Jan. 14, 1985

[30] Foreign Application Priority Data

Jan. 24, 1984 [GB] United Kingdom ............... 8401848

[51] Int. Cl.$^4$ ........................... G01L 7/08; G01L 9/04
[52] U.S. Cl. ........................................ 73/706; 73/705; 73/726; 250/231 P; 338/4
[58] Field of Search ................ 73/706, 726, 727, 728, 73/705, 708; 250/231 P; 338/4; 336/30

[56] References Cited

U.S. PATENT DOCUMENTS 3,254,536  6/1966  Brown ................................ 73/728
3,600,949  8/1971  Janeschitz-Kriegel et al. ...... 73/706
3,785,209  1/1974  Schijf ................................. 73/706

Primary Examiner—Donald O. Woodiel

[57] ABSTRACT

A pressure transducer comprising an elongate hollow outer housing having a pressure sensor diaphragm and externally positioned fixing means which facilitates pressure tight introduction of the diaphragm into a pressure sensing port provided in apparatus capable of generating pressures to be sensed, two elongate members positioned within the outer housing in operative association with the diaphragm so as to move differentially in a direction parallel with the longitudinal axis of the housing consequent upon movement of the diaphragm responsively to a pressure to be sensed, and transducer means responsive to differential movement between the elongate members for producing a signal in dependence upon the pressure sensed.

10 Claims, 3 Drawing Figures

PRESSURE TRANSDUCER

This invention relates to pressure transducers, especially to those used in processing industries such as plastics, rubber and food for sensing the pressure to which the materials are subjected during their forming processes.

In order to obtain high quality end products, melt pressures which obtain during pressure forming processes such as a plastics extrusion process must be controlled and accordingly they should be carefully monitored.

Pressure transducers suitable for monitoring such process pressures are known but known transducers tend to be somewhat inaccurate due for example to temperature dependence.

It is an aim of the present invention to provide a pressure transducer which can be used accurately to monitor material pressures, without significant temperature dependence.

According to the present invention a pressure transducer comprises an elongate hollow outer housing having a pressure sensor diaphragm and externally positioned fixing means which facilitates pressure tight introduction of the diaphragm into a pressure sensing port provided in apparatus capable of generating pressures to be sensed, two elongate members positioned within the outer housing in operative association with the diaphragm so as to move differentially in a direction parallel with the longitudinal axis of the housing consequent upon movement of the diaphragm responsively to a pressure to be sensed, and transducer means responsive to differential movement between the elongate members for producing a signal in dependence upon the pressure sensed.

The pressure transducer may be significantly less sensitive to temperature changes than currently available known pressure transducers.

Preferably, the externally positioned fixing means is a screw threaded portion but other types of externally positioned fixing means such for example as a saddle clamp and bolts may be employed.

The transducer means will usually be arranged to produce an electrical signal in dependence upon the pressure sensed. The electrical signal may be produced directly, optically or pneumatically.

The elongate members are preferably of substantially the same length.

The elongate members may comprise two coaxially arranged tubular members. The inner tubular member may be arranged in contact with the centre of the diaphragm, and the other tubular member may be arranged in contact with an end part of the housing adjacent the diaphragm, the ends of the two tubular members remote from the diaphragm being coupled to the transducer means.

The transducer means may comprise a strain gauge element or a piezo-electric device, the strain gauge element or the piezo-electric device being arranged to be responsive to differential movement between the elongate members to produce an electrical signal. Alternatively, the transducer means may comprise an optical detector arrangement responsive to differential movement between the elongate members, the optical detector arrangement including photo-detectors for enabling the production of an electrical signal.

Advantageously, the two elongate members each have a graticule secured thereto, illumination means being provided such that light shines through the graticules onto the photo-detectors whereby the electrical signal is produced consequent upon differential movement between the two elongate members.

Embodiments of the invention will now be described solely by way of example and with reference to the accompanying drawings in which.

Figure 1:
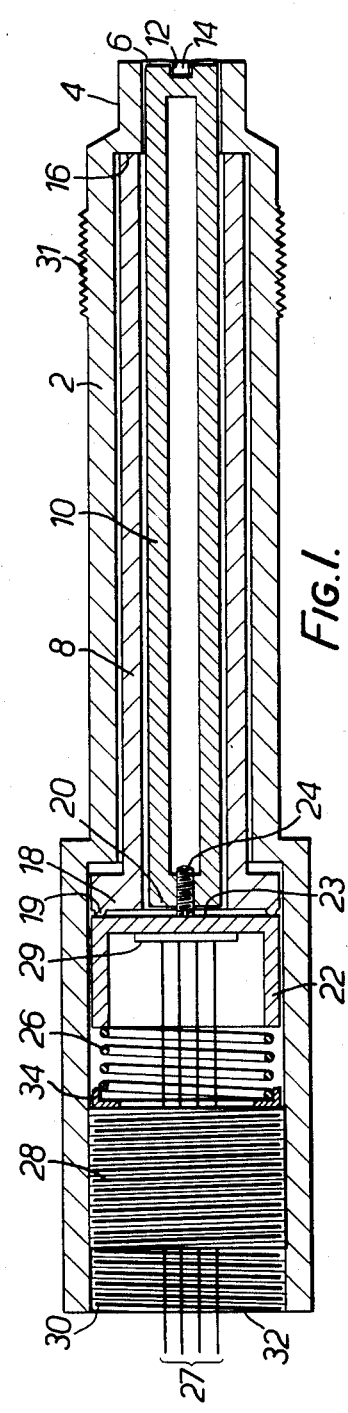
FIG. 1 is a sectional side view of a first pressure transducer.

Referring now to FIG. 1, a pressure sensitive transducer comprises an elongate tubular housing 2 which embodies an end portion 4 of reduced diameter. The end of the housing 2 adjacent to the end portion 4 is closed by a flexible metal diaphragm 6.

Positioned within the housing 2 there are provided two elongate members in the form of two hollow coaxially arranged tubular members 8 and 10. The walls of the tubular members 8, 10 are arranged to be relatively thin whereby temperature gradients are minimised. The inner tubular member 10 is provided at one end with a recess 12 which engages a projecting pip 14 positioned on the inside of the diaphragm 6 whereby the inner member 10 is positionally located. The outer tubular member 8 is arranged to abut an internal shoulder 16 within the housing 2 and end portions 18 and 20 of the tubular members 8 and 10 respectively are arranged in communication with a transducer 22. The transducer 22 includes a diaphragm 23, the centre of which is arranged in contact with an adjustment screw 24 on the end portion 20 of the tubular member 10. The end portion 18 of the tubular member 8 is provided with a generally circular rib 19 which is arranged in contact with the circumferential edge of the diaphragm 23. The transducer 22 is maintained in intimate contact with the end portions 18 and 20 of the tubular members 8, 10 respectively by means of a coil spring 26 which is maintained in position by means of a screw threaded annular plug 28 which is engaged with complementary female threads 30 formed in an open end 32 of the housing 2. In order to avoid twisting of the coil spring 26 as the plug 28 is tightened, a thrust washer 34 is provided which is positioned between the plug 28 and the coil spring 26. Leads 27 from the transducer 22 may be connected to appropriate amplification and display apparatus.

In use of the pressure transducer shown in FIG. 1, an externally screw threaded portion 31 is positioned on the outer tube 2. The screw threads on the portion 31 are arranged to be complementary with screw threads in a pressure sensing port of apparatus (not shown) capable of generating pressures to be sensed. The apparatus may for example comprise plastics extrusion apparatus and the sensing port would be arranged in communication with a die chamber where melt pressures obtain.

It will be appreciated that melt pressures will therefore be applied to the diaphragm 6 causing relative longitudinal differential movement between the tubular members 8, 10 which will cause deformation of the transducer diaphragm 23. This deformation may be arranged to deform a strain gauge 29 thereby to produce directly a corresponding electrical signal. Alternatively however other transducer movement sensing means such as a moving coil device or a piezo-electric crystal may be provided to produce a corresponding electrical signal. It should be noted that the diaphragm 23 may be replaced by another transducer device such for example as a load beam.

By providing two tubular members 8, 10 temperature differentials between these two parts are minimised, especially since the parts are relatively thin and temperature effects are therefore accordingly minimised since temperature gradients across the members 8 and 10 are virtually eliminated. In addition, differential expansion between the body 2 and tubular members 8, 10 is accommodated by action of the spring 26, thereby producing a virtually temperature-independent system. The major temperature variations may arise from the transducer means used.

Figure 2:
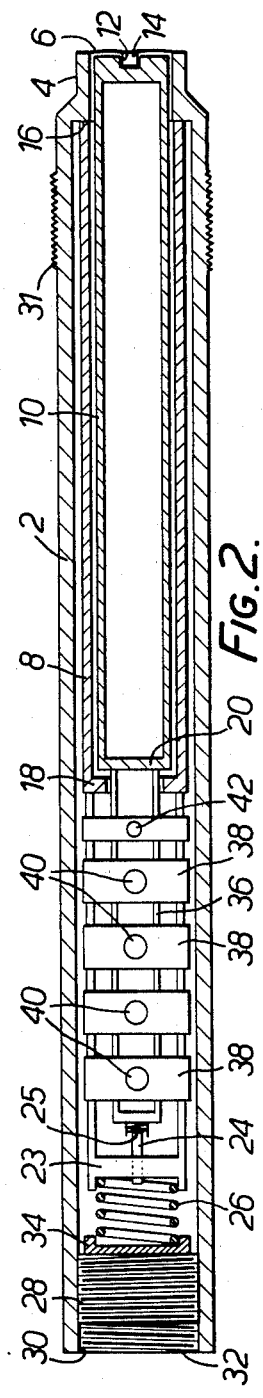
FIG. 2 is a sectional side view of a second pressure transducer including an optical detector.

Referring now to FIG. 2, wherein corresponding parts bear as appropriate the same numerical designations, an optical indicator is provided comprising parts positioned between the end portions 18 and 20 of the tubular members 8, 10 and the coil spring 26, so as to define an optical detector arrangement sensitive to differential movement between the tubular members 8, 10.

The optical detector arrangement comprises a primary graticule 36 having say 100 lines per millimeter. This primary graticule 36 is rigidly attached to the inner tubular member 10 and co-operates optically with secondary glass graticules 38 having the same pitch as the primary graticule 36 and being rigidly secured to the outer tubular member 8. A suitable means of illumination is provided (not shown) such that light shines through the graticules 36 and 38 on to photo-detectors 40 so that as the diaphragm 6 is deformed, the graticules 38 and 36 will move relative to each other whereby light and dark bands are produced which are sensed by the photo-detectors in such a manner as to produce an output signal related to the relative movement between the tubular members 8, 10. The graticules and photo-detectors are mounted and arranged in such a manner that the light and dark bands produced by movement between the inner and outer tubular members 8, 10 have phase relationships of Sin $\phi$, $-$Sin $\phi$, Cos $\phi$, and $-$Cos $\phi$.

Suitable circuitry (not shown) is provided whereby the number of lines eclipsed is counted and the direction of movement ascertained. Thus, the distance moved by the diaphragm 6 can be determined and by calibration the pressures causing the movement can be indicated. As shown in FIG. 1 the spring 26 is compressed by the thrust washer 34 and the screw plug 28 to ensure that the outer tubular member 8 is held firmly but not rigidly against the shoulder 16. Similarly, in FIG. 2, the graticule 36 and the inner tubular member 10 to which it is attached are held against the diaphragm 6. This is effected by an adjuster 24 bearing on a spring 25 of greater compliance than the spring 26 and correct adjustment is detected by a photo-detector 42 which corresponds to a datum point on the graticule 36 whereby the transducer may be set to zero.

It will be appreciated by those skilled in the art that the graticules 36 and 38 can be mounted so as to operate as Moiré fringe generators.

The graticules 38 and 36 may be made of a material with a low coefficient of expansion, for example glass. It is envisaged that the temperature coefficient of the pressure transducer should be of the order of 0.1% over a temperature of 500° C. This represents a significant improvement over known pressure transducer arrangements.

Figure 3:
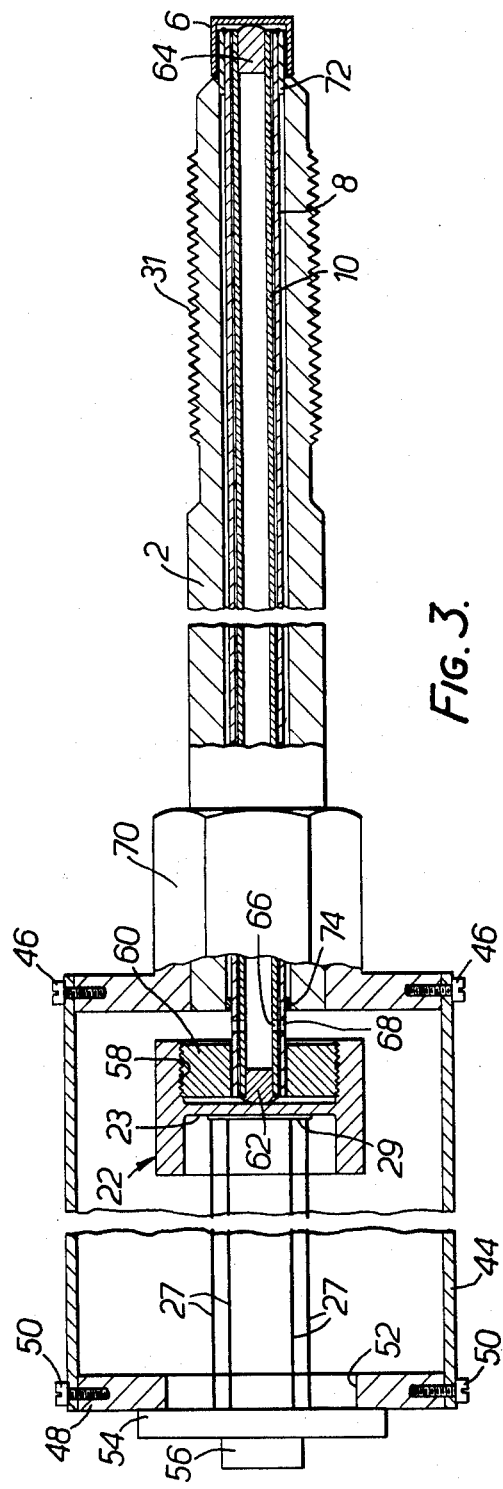
FIG. 3 is a sectional side view of a third pressure transducer.

Referring now to FIG. 3, corresponding parts as in FIG. 1 have been given the same numerical designations and their precise construction and operation will not again be given. In FIG. 3, the geometry of the body 2 is slightly different than in FIG. 1 as shown. In FIG. 3, the left hand end of the body 2 is formed as a cylinder 44 which is held in position by screws 46. The cylinder 44 can then be removed as desired to provide easy access to the diaphragm 23 and the strain gauge 29.

The end of the cylinder 44 is closed by a plate 48 which is secured in position by screws 50. The plate 48 has a central aperture 52 and leads 27 from the strain gauge 29 can pass to an electrical connector 54 mounted on the plate 48. The electrical connector 54 has a plug-in socket portion 56 as shown.

In FIG. 3, the diaphragm 22 is I-shaped in cross-section as shown. A recess 58 in the diaphragm 22 is internally threaded and it screws onto an externally threaded flange 60 which is welded to the tubular member 8. The diaphragm 22 can thus be screwed along the flange 60 and this obviates the need for the adjuster 24.

The ends of the tubular member 10 are sealed by a pair of plugs 62, 64, the plugs 62, 64 being made of a hardened metal and being welded in position.

The tubular members 8, 10 are provided with pressure relief holes 66, 68 to prevent a build up of gas pressure in the tubular members 8, 10 caused by the heating of the pressure transducer. As can be seen, any gases formed can effectively vent to atmosphere via the holes 66, 68.

The body 2 is provided with a nut 70, by means of which the externally screw threaded portion 31 can be screwed into a port of apparatus (not shown) capable of generating pressures to be sensed.

In FIG. 3, it will be seen that the diaphragm 6 is in the form of a cap which is welded in position to a cylindrical extension part 72 of the body 4, and which bears on the curved end of the plug 64.

A support bush 74 is provided for mounting the tubular member 8 in the body 2.

Various modifications may be made to the pressure transducers shown without departing from the scope of the invention and for example alternative optical or electrical sensing arrangements may be provided. Also, the position of the screw threaded portion 31 may be varied. The shape of the outer tube 2 may be altered to suit the geometry of the apparatus into which it is placed. If desired the two tubular members 8, 10 may be replaced by rods or other elongate members. A temperature sensor such as a thermocouple may be provided towards the front end of the pressure transducer to measure temperature. If desired, the pressure transducer can produce an optical signal in dependence upon the pressure sensed instead of the electrical signal.

What is claimed is:

1. A pressure transducer comprising an elongate hollow outer housing having a pressure sensor diaphragm and externally positioned fixing means which facilitates pressure tight introduction of the diaphragm into a pressure sensing port provided in apparatus capable of generating pressures to be sensed, two elongate members positioned within the outer housing in operative association with the diaphragm so as to move differentially in a direction parallel with the longitudinal axis of the housing consequent upon movement of the diaphragm responsively to a pressure to be sensed, and transducer means responsive to differential movement between the elongate members for producing a signal in dependence upon the pressure sensed.

2. A pressure transducer according to claim 1 in which the externally positioned fixing means is an externally positioned screw threaded portion.

3. A pressure transducer according to claim 1 in which the transducer means is arranged to produce an electrical signal in dependence upon the pressure sensed.

4. A pressure transducer according to claim 1 in which the elongate members are of substantially the same length.

5. A pressure transducer according to claim 1 in which the elongate members comprise two coaxially arranged tubular members.

6. A pressure transducer according to claim 5 in which the inner tubular member is arranged in contact with the centre of the diaphragm, and in which the outer tubular member is arranged in contact with an end part of the housing adjacent the diaphragm, the ends of the two tubular members remote from the diaphragm being coupled to the transducer means.

7. A pressure transducer according to claim 6 in which the transducer means comprises a strain gauge element which is arranged to be responsive to differential movement between the elongate members to produce an electrical signal.

8. A pressure transducer according to claim 6 in which the transducer means comprises a piezo-electric device which is arranged to be responsive to differential movement between the elongate members to produce an electrical signal.

9. A pressure transducer according to claim 1 in which the transducer means comprises an optical detector arrangement responsive to differential movement between the elongate members, the optical detector arrangement including photo-detectors for enabling the production of an electrical signal.

10. A pressure transducer according to claim 9 in which the two elongate members each have a graticule secured thereto, illumination means being provided such that light shines through the graticules onto the photo-detectors whereby the electrical signal is produced consequent upon differential movement between the two elongate members.

* * * * *